United States Patent

Unno

[11] Patent Number: 5,866,491
[45] Date of Patent: Feb. 2, 1999

[54] LOW FRICTIONAL CERAMIC MATERIAL FOR SLIDING MEMBER

[75] Inventor: Yasuaki Unno, Fujisawa, Japan

[73] Assignee: Isuzu Ceramics Research Institute Co., Ltd., Fujisawa, Japan

[21] Appl. No.: 813,443

[22] Filed: Mar. 10, 1997

[30] Foreign Application Priority Data

Mar. 13, 1996 [JP] Japan ..................... 8-084728

[51] Int. Cl.⁶ ................................. C04B 35/10
[52] U.S. Cl. .................. 501/127; 501/152; 501/153
[58] Field of Search ...................... 501/152, 127, 501/153

[56] References Cited

U.S. PATENT DOCUMENTS

| 4,506,020 | 3/1985 | Butler et al. | 501/97 |
| 5,556,270 | 9/1996 | Komine et al. | 501/105 |
| 5,645,618 | 7/1997 | Monroe et al. | 51/309 |

FOREIGN PATENT DOCUMENTS

| 245656 | 12/1996 | European Pat. Off. |
| 63-265860 | 11/1988 | Japan. |
| 401234354 | 9/1989 | Japan. |
| 40321534 | 9/1991 | Japan. |
| 4144969 A2 | 5/1992 | Japan. |
| 406234569 A | 8/1994 | Japan. |
| 7196375 A2 | 8/1995 | Japan. |
| 1511243 | 9/1989 | U.S.S.R. |

OTHER PUBLICATIONS

"Effect of Yttria and Ceria on Mechanical Properties and Oxidation Behavior of α–sialon Ceramics" Lee et al. Yoop Hakhoechi(1993), 30 (11) pp. 941–948.

*Primary Examiner*—Paul Marcantoni
*Attorney, Agent, or Firm*—Staas & Halsey

[57] ABSTRACT

A low frictional ceramic material for sliding member, consists essentially of oxide of aluminum (Al) and oxide of zirconium (Zr) and contains oxide of cerium (Ce). Aluminum (Al) content is 50 to 75 wt. % in terms of alumina ($Al_2O_3$), zirconium (Zr) content is 20 to 45 wt. % in terms of zirconia ($ZrO_2$), and cerium (Ce) content is 3 to 20 wt. % in terms of ceria ($CeO_2$) in said low frictional ceramic material for sliding member.

Instead of oxide of aluminum (Al) and oxide of zirconium (Zr), it is capable to use a α-sialon.

2 Claims, 2 Drawing Sheets

LOW FRICTIONAL CERAMIC MATERIAL FOR SLIDING MEMBER

BACK GROUND OF THE INVENTION

The present invention relates to a low frictional ceramic material for sliding member which is high in mechanical strength, small in coefficient of friction and excellent in abrasion resistance.

Generally, an iron based material is used for a sliding member, ceramics such as alumina ($Al_2O_3$) is used for a sliding member for which abrasion resistance is required, and silicon nitride ($Si_3N_4$) and zirconia ($ZrO_2$) which is higher in price than alumina are used for a construction member for which mechanical strength and toughness are required, as disclosed in Japanese Patent Laid-Open No. 63-265,860 Publication.

The iron based material undergoes cohesion and transition under the severe sliding conditions and becomes worn. Alumina is excellent in abrasion resistance but cannot expect a low frictional property because it is hard to adsorb lubricating oil. Further, alumina is inferior in toughness compared to silicon nitride and zirconia.

An alumina sintered body containing 10 to 60 vol. % of needle-like La based β-alumina (see Japanese Patent Laid-Open No. 63-134551 Publication) is excellent in mechanical properties such as toughness but is large in coefficient of friction because it is hard to adsorb lubricating oil. When it contains 30 vol. % or more of needle-like crystal material, the number of pores increases and the strength materially lowers.

An alumina sintered body using needle-like boric acid aluminum as a precursor is also large in coefficient of friction because it is hard to adsorb lubricating oil. Further, since raw material is needle-like, it is difficult to be mixed evenly. Accordingly, a better sintered body cannot be obtained unless a sintering method utilizing high pressure such as HIP (Hot Hydrostatic Press), HP (Hot Press) and the like is used.

In view of the aforementioned problem, it is an object of the present invention to provide a low frictional ceramic material for sliding member which is well conformed to lubricating oil, small in coefficient of friction, and excellent in mechanical strength, heat resistance and abrasion resistance.

SUMMARY OF THE INVENTION

The low frictional ceramic material for sliding member according to the present invention is characterized by essentially consisting, as raw materials, oxide of aluminum (Al) or α-sialon to which is added oxide of cerium (Ce).

In case the oxide of aluminum (Al) is used as raw material, addition of the oxide of zirconium (Zr) enhances property of mechanical strength.

In a view of the structure of tissue, the low frictional ceramic material for sliding member according to the present invention comprises alumina as a matrix, and needle-like crystal substance such as 5 to 30 wt. % of $CaAl_{12}O_{19}$ contained the matrix and 3 to 20 wt. % of ceria contained the matrix. Since ceria as a dispersive phase tends to adsorb lubricating oil, the low frictional ceramic material for sliding member according to the present invention is smaller in coefficient of friction than conventional alumina and conventional alumina containing a needle-like crystal substance. Further, since the needle-like crystal substance such as $CaAl_{12}O_{19}$ as a dispersive phase and ceria impedes cracks due to the external force and deflects or goes round a direction of the crack, the low frictional ceramic material for sliding member according to the present invention is high in toughness as compared with conventional alumina and conventional alumina containing a needle-like crystal substance.

These and other objects and features of the invention will become more apparent upon a perusal of the following description taken in conjunction with the accompanying drawings.

DESCRIPTION OF THE PREFERRED EMBODIMENTS

Figure 1:
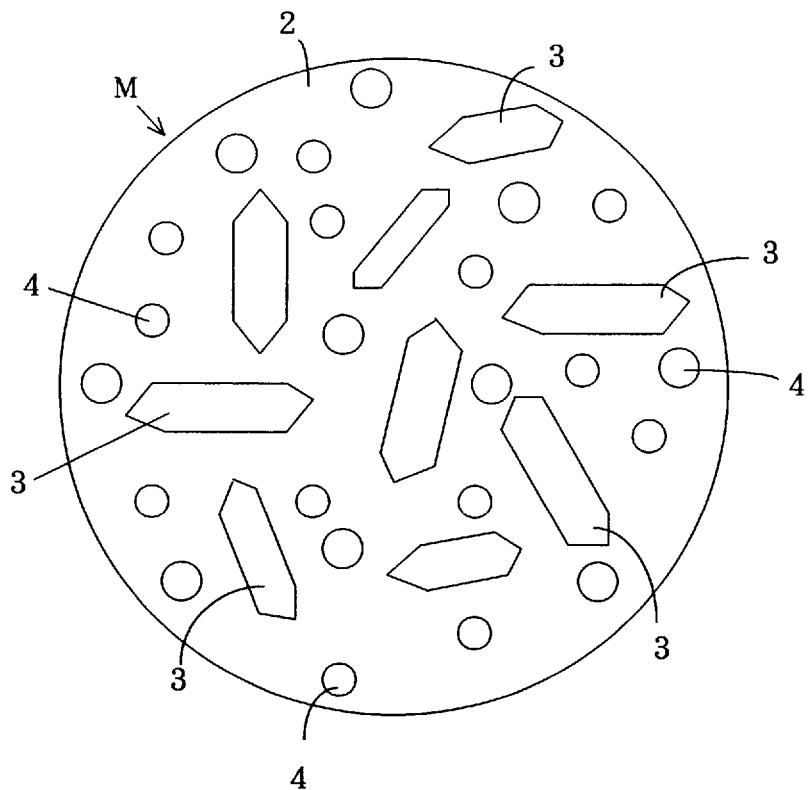
FIG. 1 is a schematic view showing a tissue section of low frictional ceramic material for sliding member according to the present invention.

As shown in FIG. 1, a low frictional ceramic material for sliding member "M" according to the present invention is characterized in that β-alumina 3 in the form of a needle-like crystal and a spherical particle 4 of ceria ($CeO_2$) of which particle diameter or grain size is 10 μm or less are mixed in a matrix 2 comprising fine particulate of α-alumina ($Al_2O_3$). More specifically, 5 to 30 parts of β-alumina and 3 to 20 parts of ceria are mixed in a matrix 2 comprising 50 to 92 parts of α-alumina (parts termed herein represent weight ratio). For β-alumina, at least one is selected out of $CaAl_{12}O_{19}$, $SrAl_{12}O_{19}$, $BaAl_{12}O_{19}$ and $LaAl_{11}O_{18}$.

EXAMPLE 1

Alumina ($Al_2O_3$) powder, zirconia ($ZrO_2$) powder containing 5 wt. % of yttria ($Y_2O_3$), and ceria ($CeO_2$) powder were prepared in a weight compound ratio of 55:40:5 and mixed in a ball mill while crushing them for 24 hours. A molded body was pressed and molded from the obtained mixed powder was sintered for about three hours in air at a temperature of approximately 1,500° C. to obtain a sintered body as a low frictional ceramic material for sliding member.

The low frictional ceramic material for sliding member of this invention obtained as described above was analyzed in tissue to find that alumina ($Al_2O_3$) particles having a particle diameter of 3 μm or less, zirconia ($ZrO_2$) particles containing yttrium (Y) and cerium (Ce) were evenly dispersed in the material, ceria ($CeO_2$) was present in grain boundary phase, and pores were present having an inside diameter of 5 μm or less.

Next, the low frictional ceramic material for sliding member of this invention was processed to have a dimension 65×15×10 mm (a surface roughness Rz of the sliding surface is 0.4 μm or less) to prepare a plate for sliding test. As a comparative material, a cast iron was processed to have the same dimension to prepare a plate for sliding test. On the other hand, as a mating material, a pin for sliding test having 8 mm of outside diameter and 23 mm of length was prepared from spheroidal graphite cast iron, and one end of the pin for sliding test was processed to a hemispherical shape (SR18).

Figure 2:
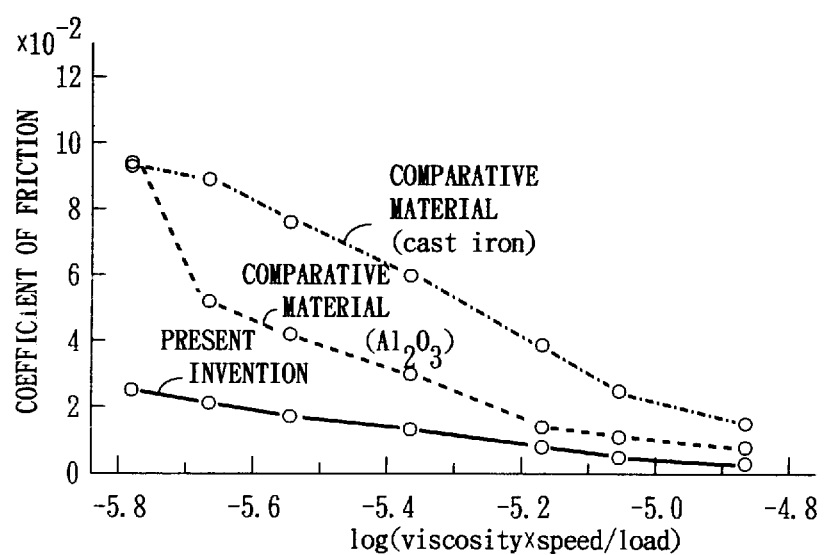
FIG. 2 is a diagram showing the frictional characteristic of the low frictional ceramic material for sliding member.

A hemispherical extreme end of the pin for sliding test was pressed against the plate for sliding test, lubricating oil was supplied, and the plate for sliding test was slidably reciprocated to measure the coefficient of friction, using a reciprocating type sliding tester. The sliding test conditions were that a mean speed was 0.2 m/sec, load was 0.2 to 15 kgf, and a temperature was 100° C. For lubricating between the plate and the pin, lubricating oil "A" for Diesel engine (lubricating oil containing detergent) was used. As will be apparent from the test result shown in FIG. 2 (Stribeck curve), the low frictional ceramic material for sliding member of this invention is excellent in frictional characteristic as compared with a comparative material (cast iron).

The weight compound ratio of raw powder was variously changed to prepare sintered bodies as low frictional ceramic material for sliding members, as shown in Table 1 samples A11 to A13 and A21 to A24, by process substantially similar to that of the aforementioned Example 1, and the coefficient of friction of the low frictional ceramic material for sliding members was measured by the sliding test similar to the above. As will be apparent from the measured result shown in Table 1, the optimal weight compound ratio of raw materials for obtaining a low frictional ceramic material for sliding member which is small in coefficient of friction is preferably 50 to 75 wt. % for alumina ($Al_2O_3$), 20 to 45 wt. % for zirconia ($ZrO_2$), and 3 to 20 wt. % for ceria ($CeO_2$).

In order to examine the influence of the detergent contained in lubricating oil, the lubricating oil "A" and lubricating oil without the detergent (referred to as lubricating oil "B") were used, and similar sliding test was conducted. The coefficient of friction of the low frictional ceramic material for sliding members A11 to A13 of this invention and the comparative materials A21 to A24 were measured. The sliding test conditions were that a mean speed was 0.2 m/sec, a load was 10 kgf, and a temperature was 100° C. The coefficient of friction of low frictional ceramic material for sliding members A11 to A13 of this invention are not affected by the detergent, as shown in Table 2. On the other hand, the comparative materials A21 to A24 are affected by the detergent, that is, the coefficient of friction increases under the lubricating oil "A" containing the detergent.

TABLE 1

| sample | compound ratio (wt. %) | | | | coefficient of friction |
|---|---|---|---|---|---|
| | $Al_2O_3$ | $ZrO_2$ | α-sialon | $CeO_2$ | |
| A11 | 50 | 45 | 0 | 5 | 0.025 |
| A12 | 50 | 40 | 0 | 10 | 0.029 |
| A13 | 70 | 20 | 0 | 10 | 0.024 |
| *A21 | 79 | 20 | 0 | 1 | 0.058 |
| *A22 | 90 | 5 | 0 | 5 | 0.060 |
| *A23 | 40 | 50 | 0 | 10 | 0.055 |
| *A24 | 70 | 10 | 0 | 20 | 0.064 |
| B11 | 0 | 0 | 95 | 5 | 0.032 |
| B12 | 0 | 0 | 85 | 15 | 0.030 |
| *B21 | 0 | 0 | 100 | 0 | 0.054 |
| *B22 | 0 | 0 | 75 | 25 | 0.062 |
| *C21 | cast iron | | | | 0.058 |

TABLE 2

| kind of lubricating oil | lubricating oil "A" containing detergent | lubricating oil "B" not containing detergent |
|---|---|---|
| coefficient of friction of ceramic material by | 0.027 | 0.027 |

TABLE 2-continued

| kind of lubricating oil | lubricating oil "A" containing detergent | lubricating oil "B" not containing detergent |
|---|---|---|
| the invention coefficient of friction of comparative material | 0.058 | 0.032 |

EXAMPLE 2

α-sialon powder and ceria ($CeO_2$) powder were prepared in weight compound ratio of 95:5, and mixed in a ball mill for about 24 hours while crushing them. A molded body was pressed and molded from the obtained mixed powder., and the molded body was sintered for about three hours in the nitrogen atmosphere at a temperature of 1,800° C. to obtain a sintered body as a low frictional ceramic material for sliding member.

With respect to the low frictional ceramic material for sliding member of this invention obtained as described above, the coefficient of friction was measured by the same manner as that of Example 1. The weight compound ratio of raw powder was variously changed to prepare sintered bodies as low frictional ceramic material for sliding member (samples B11, B12, B21 and B22 in Table 1), and the coefficient of friction of the low frictional ceramic material for sliding members was measured by the sliding test similar to the above. As will be apparent from the measured result shown in Table 1, the coefficient of friction of the low frictional ceramic material for sliding members (samples B11 and B12 in Table 1) of this invention were low as compared with that of the comparative materials (samples B21 and B22 in Table 1).

As will be apparent from the measured result shown in Table 1, the optimal weight compound ratio of raw materials for obtaining the low frictional ceramic material for sliding member having a small coefficient of friction is preferably 85 to 97 wt. % for α-sialon and 3 to 15 wt. % for ceria ($CeO_2$). When the weight compound ratio is outside the range of the above-described ratio, the coefficient of friction becomes large. Namely, when the addition of ceria ($CeO_2$) is less than 3 wt. %, the oil holding property on the surface of the sintered body is poor, while when the addition of ceria ($CeO_2$) is above 15 wt. %, the number of pores of the sintered body increases so that irregularities occur on the surface of the sintered body.

EXAMPLE 3

For obtaining the low frictional ceramic material for sliding member of this invention, α-alumina powder, ceria powder and a precursor of $CaAl_{12}O_{19}$ powder were prepared and mixed while crushing them for 24 hours in a ball mill. A molded body was pressed and molded from the obtained powder, and then it was sintered for about three hours in air at a temperature of approximately 1,600° C.

With respect to the obtained low frictional ceramic material for sliding member, the tissue thereof was examined. As a result, it has been found that $CaAl_{12}O_{19}$ needle-like crystal substances having a aspect ratio (elongation ratio) is 3 to 10 and length is 5 to 20 μm were dispersed, and substantially spherical ceria particles having a particle diameter or grain size of 10 μm or less and preferably 5 μm or less were evenly dispersed. The weight ratios (obtained from volume ratio and specific gravity; the same is true hereinafter) between α-alumina, ceria and $CaAl_{12}O_{19}$ contained in the low frictional ceramic material for sliding member of this invention were 75 wt. % for α-alumina, 10 wt. % for ceria and 15 wt. % for $CaAl_{12}O_{19}$.

A rectangular plate for sliding test having a dimension 65×15×10 mm was cut out from the low frictional ceramic material for sliding member of this invention, and the surface roughness Rz of the sliding surface was processed to 0.4 μm or less. As a comparative material, a similar plate for sliding test was prepared from alumina added no ceria thereto and cast iron, respectively. On the other hand, as a mating material, a pin for sliding test having 8 mm of outside diameter and 23 mm of length was prepared from spheroidal graphite cast iron, and one end of the pin for sliding test was processed to a hemispherical shape (SR18). The pin for sliding test was vertically pressed against the plate for sliding test and relatively slidably moved to measure the coefficient of friction, using a reciprocating type sliding tester. The sliding conditions were that a mean sliding speed was 0.2 m/sec, a pressing load of the pin for sliding test was 0.2 to 15 kgf, and a temperature was 100° C. For lubricating sliding portions, lubricating oil for Diesel engine (lubricating oil "A" described above) was used. It is understood from Stribeck curve according to the result of aforementioned sliding test, shown in FIG. 2, that the low frictional ceramic material for sliding member of this invention is excellent in frictional characteristic as compared with the comparative material.

Figure 3:
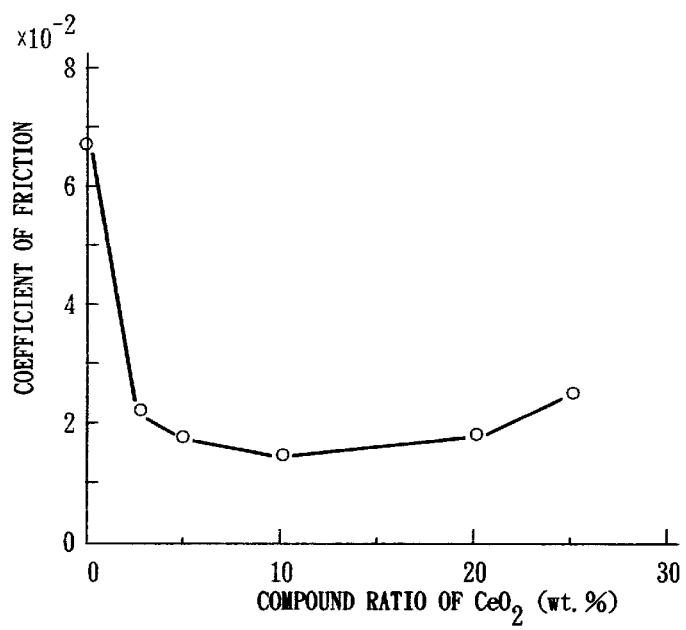
FIG. 3 is a diagram showing the relationship between the addition of ceria and coefficient of friction of the low frictional ceramic material for sliding member.
Figure 4:
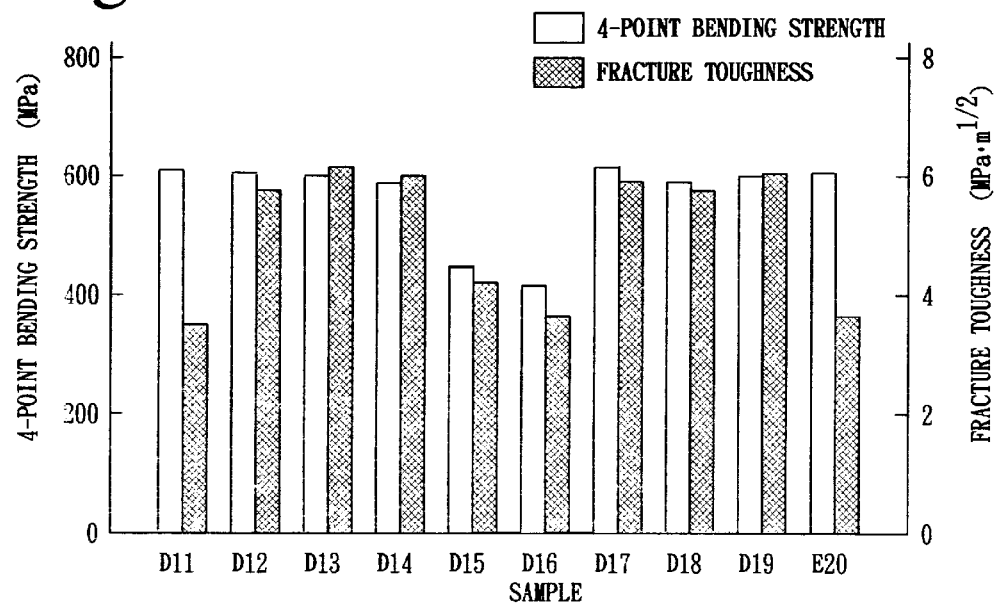
FIG. 4 is an illustrated view showing the mechanical strength of the low frictional ceramic material for sliding member according to the present invention and the conventional low frictional ceramic material for sliding member.

A beam-like strength test piece having a dimension 4×3×40 mm prepared from the low frictional ceramic material for sliding member of this invention was used to measure 4-point bending strength and fracture toughness value. It is understood that according the test result, as shown in FIG. 4, the low frictional ceramic material for sliding member (sample D13 in Table 3) of this invention substantially equal in the 4-point bending strength to that of conventional alumina (sample E20 in Table 3), and is higher in the fracture toughness than that of conventional alumina.

frictional ceramic material for sliding member. The above-described plate for sliding test was used and the coefficient of friction thereof was measured by the reciprocating type sliding tester under the sliding conditions similar to those of Example 3. According to the result of the sliding test, as shown in FIG. 3, it is understood that the low frictional ceramic material for sliding member of this invention is small in coefficient of friction when the addition of ceria with respect-to the sum total of raw material exceeds 3 wt. %, and is large in coefficient of friction when the addition of ceria with respect to the sum total of raw material exceeds 20 wt. %. It is considered that the coefficient of friction is small when ceria is added because the adsorbing property of lubricating oil to the low frictional ceramic material for sliding member is enhanced. It is considered that the coefficient of friction is large when the addition of ceria exceeds 20 wt. % because pores increase in the sintered body, and irregularities occur in the surface (sliding surface) of the low frictional ceramic material for sliding member due to the presence of the pores.

A beam-like strength test piece having a dimension 4×3×40 mm prepared from the low frictional ceramic material for sliding member of this invention was used to measure 4-point bending strength and fracture toughness value, similar to the case of Example 3. According to the aforementioned test result, shown in FIG. 4, it has been found that when the weight ratio of $CaAl_{12}O_{19}$ with respect to the sum total of raw material is 5to 30 wt. %, the 4-point bending strength and fracture toughness value were enhanced. The reason is that when the weight ratio of $CaAl_{12}O_{19}$ is less than 5 wt. %, the suppression effect of cracks cannot be obtained, and when the weight ratio of $CaAl_{12}O_{19}$ exceeds 30 wt. %, the pores of the sintered body increase.

It has been found from the above-described test result that when the composition weight ratio of the low frictional ceramic material for sliding member of this invention is 50 to 92 parts for α-alumina, 5 to 30 parts for β-alumina and 3 to 20 parts for ceria, the excellent frictional characteristic and mechanical characteristic are obtained.

TABLE 3

| | compound ratio (wt. %) | | | | | | |
|---|---|---|---|---|---|---|---|
| sample | α-$Al_2O_3$ | $CaAl_{12}O_{19}$ | $SrAl_{12}O_{19}$ | $BaAl_{12}O_{19}$ | $LaAl_{11}O_{18}$ | $CeO_2$ | MgO |
| D11 | 95 | 0 | 0 | 0 | 0 | 5 | 0 |
| D12 | 92 | 5 | 0 | 0 | 0 | 3 | 0 |
| D13 | 75 | 15 | 0 | 0 | 0 | 10 | 0 |
| D14 | 60 | 30 | 0 | 0 | 0 | 10 | 0 |
| D15 | 50 | 40 | 0 | 0 | 0 | 10 | 0 |
| D16 | 40 | 40 | 0 | 0 | 0 | 20 | 0 |
| D17 | 75 | 0 | 15 | 0 | 0 | 10 | 0 |
| D18 | 75 | 0 | 0 | 15 | 0 | 10 | 0 |
| D19 | 75 | 0 | 0 | 0 | 15 | 10 | 0 |
| *E20 | 98 | 0 | 0 | 0 | 0 | 0 | 2 |

EXAMPLE 4

Similar to the case of Example 3, α-alumina powder, ceria powder and a precursor of various β-alumina ($CaAl_{12}O_{19}$, $SrAl_{12}O_{19}$, $BaAl_{12}O_{19}$, etc.) powder were prepared at a weight ratio shown in Table 3 and mixed while crushing them for 24 hours in a ball mill. A molded body was pressed and molded from the obtained powder, and then it was sintered for about three hours in air at a temperature of approximately 1,600° C. to obtain low frictional ceramic material for sliding member.

A plate for sliding test and a strength test piece similar to those of Example 3 were prepared from the obtained low As described above, the low frictional ceramic material for sliding member of this invention, contains β-alumina and 5 to 20 wt. % of ceria in a matrix comprising α-alumina, the particle diameter or grain size of ceria being under 10 μm. The adsorptive property (conformability) of lubricating oil is improved by the addition of ceria and the low frictional ceramic material for sliding member is high in mechanical strength and toughness, small in coefficient of friction, thus causes less frictional force and amount of abrasion in a sliding portion.

Obviously, many modifications and variations of the present invention are possible in right of the above teachings. It is to be understood, therefore, that the invention can be practiced otherwise than as specifically described.

What is claimed is:

1. A low frictional ceramic material comprising:
   a matrix containing 50 to 92 wt. % α-alumina;
   needle-shaped crystals evenly dispersed through the matrix, said needle-shaped crystals containing 5 to 30 wt. % of β-alumina; and
   5 to 20 wt. % of spherical ceria particles having a diameter of less than 10 μm.

2. The low frictional ceramic material according to claim 1, wherein said β-alumina is selected from the group consisting of $CaAl_{12}O_{19}$, $SrAl_{12}O_{19}$, $BaAl_{12}O_{19}$ and $LaAl_{11}O_{18}$.

* * * * *